(12) United States Patent
Muto

(10) Patent No.: US 9,247,092 B2
(45) Date of Patent: Jan. 26, 2016

(54) IMAGE PROCESSING APPARATUS, CONTROL METHOD OF IMAGE PROCESSING APPARATUS, AND PROGRAM

(71) Applicant: CANON KABUSHIKI KAISHA, Tokyo (JP)

(72) Inventor: Tsuyoshi Muto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/297,180

(22) Filed: Jun. 5, 2014

(65) Prior Publication Data

US 2014/0368872 A1 Dec. 18, 2014

(30) Foreign Application Priority Data

Jun. 14, 2013 (JP) ................. 2013-125272

(51) Int. Cl.
G06F 3/12 (2006.01)
H04N 1/00 (2006.01)
H04N 1/32 (2006.01)

(52) U.S. Cl.
CPC ....... *H04N 1/00954* (2013.01); *H04N 1/32053* (2013.01)

(58) Field of Classification Search
None
See application file for complete search history.

(56) References Cited

U.S. PATENT DOCUMENTS

| 5,392,131 | A * | 2/1995 | Umeno ............... H04N 1/00915 358/400 |
| 6,606,164 | B1 * | 8/2003 | Irie ....................... G06F 3/1288 358/1.15 |
| 7,403,312 | B2 * | 7/2008 | Soneoka ..................... 358/474 |
| 8,223,354 | B2 * | 7/2012 | Itagaki ......................... 358/1.14 |
| 8,248,642 | B2 * | 8/2012 | Umetsu ........................ 358/1.15 |
| 8,582,161 | B2 * | 11/2013 | Okada ................... G06F 3/1212 358/1.13 |
| 8,643,873 | B2 * | 2/2014 | Nakamura ............ G06F 21/608 358/1.1 |
| 2007/0240159 | A1 * | 10/2007 | Sugiyama ..................... 718/102 |
| 2009/0195815 | A1 * | 8/2009 | Naito et al. .................. 358/1.15 |
| 2010/0091318 | A1 * | 4/2010 | Ferlitsch ...................... 358/1.15 |
| 2012/0026524 | A1 * | 2/2012 | Sekido et al. ................ 358/1.13 |
| 2012/0033251 | A1 * | 2/2012 | Okada et al. ................. 358/1.15 |
| 2012/0086965 | A1 * | 4/2012 | Kang et al. ................... 358/1.13 |
| 2012/0268766 | A1 * | 10/2012 | Okubo ......................... 358/1.13 |
| 2013/0013946 | A1 * | 1/2013 | Hamada ....................... 713/323 |

FOREIGN PATENT DOCUMENTS

| JP | 2006-203720 A | 8/2006 |
| JP | 2011-142753 A | 7/2011 |

* cited by examiner

*Primary Examiner* — Satwant Singh
(74) *Attorney, Agent, or Firm* — Fitzpatrick, Cella, Harper & Scinto

(57) ABSTRACT

The image processing apparatus has a timer transmission function to execute a transmission job for transmitting image data to another apparatus at a designated transmission time of day. The image processing apparatus comprises a setting unit configured to set a restraint period of time indicating a period of time that the execution of the transmission job has to be restrained based on charge information for respective periods of time including unit prices of electricity charges for respective periods of time; and a reservation unit configured to present the restraint period of time, accept the designation of the transmission time of day, and store the designated transmission time of day as reservation information in a storage unit; and a notifying unit configured to perform notification to a user in a case where the designated transmission time of day is included in the restraint period of time.

9 Claims, 8 Drawing Sheets

IMAGE PROCESSING APPARATUS, CONTROL METHOD OF IMAGE PROCESSING APPARATUS, AND PROGRAM

BACKGROUND OF THE INVENTION

1. Field of the Invention

The present invention relates to an image processing apparatus, a control method of the image processing apparatus, and a program to be used in the control method.

2. Description of the Related Art

Conventionally, various kinds of communication apparatuses such as a facsimile apparatus which transmits/receives image information to/from an apparatus of a communication partner through a communication line such as a telephone line or an Internet line, and the like have been widely used. In these communication apparatuses, there is the communication apparatus of a type having a timer transmission function. Here, the timer transmission function is the function by which, in a case where a user has previously reserved a transmission date and hour so as to transmit data in the middle of the night or the early morning during which the communication charges are fixed or in a period of time or a time of day which is convenient to the communication partner, a transmission process is automatically performed at the reserved date and hour.

During recent years, in order to achieve leveling of power demand, contracts respectively based on electricity charges for respective periods of time in which the electricity charge varies for each period of time according to a season, a day of the week or the like and real-time electricity charges in which the electricity charge varies every day according to a temperature or the like have been concluded. More specifically, in case of using the electricity charges for respective periods of time, charge information of the electricity charges for the respective periods of time is provided by an electric power company, and power consumption of the apparatus is controlled based on the provided charge information.

In Japanese Patent Application Laid-Open No. 2011-142753, a table of electricity charges in which periods of time have been respectively associated with electricity charges is acquired from a management server, and a reduction period of time in which power consumption of household electrical appliances has to be reduced is determined based on the acquired table of electricity charges. Then, a control command for reducing the power consumption of an apparatus in the determined reduction period of time is generated, and the generated control command is actually transmitted to the apparatus.

In Japanese Patent Application Laid-Open No. 2006-203720, the electricity charge necessary for watching and/or recording a TV (television) program is displayed in a TV (television) program guide, and, when a TV program is selected, the electricity charge of the same TV program provided in another period of time is displayed together with the electricity charge of the selected TV program. By such displays, it is possible to reserve watching and recording of a TV program at the low electricity charge.

However, in the above conventional image processing apparatus transmits/receives the image information, when timer transmission is reserved, it is impossible for a user to grasp whether or not the unit price of the electricity charge at the reserved transmission date and hour corresponds to the unit price of the electricity charge at which the administrator of the apparatus requires the user to restrain from transmitting the image information. For this reason, there is a problem that the user transmits the image information in the period of time of the high electricity charge without restraint.

More specifically, in the technique disclosed in Japanese Patent Application Laid-Open No. 2011-142753, since the control does not change at the time when the user reserves the timer transmission, there is a problem that the user cannot know the electricity charge at the reserved transmission date and hour.

Moreover, in the technique disclosed in Japanese Patent Application Laid-Open No. 2006-203720, although the electricity charge is displayed for each TV program, there is a problem that the user cannot know whether or not the displayed electricity charge is based on the unit price of the electricity charge by which watching and recording of the TV program have to be restrained. Moreover, there is a problem that the timer transmission is probably performed at the high electricity charge in a case where the electricity charge at the transmission date and hour is not determined at the time when the user reserves the timer transmission or in a case where the electricity charge of the transmission date and hour is changed after the reservation.

The present invention has been completed in order to solve the above problems, and an object thereof is to provide a mechanism which controls the electric power costs by causing the user to designate the timer transmission in the period of time of relatively low unit price of the electricity charges.

SUMMARY OF THE INVENTION

The present invention is directed to an image processing apparatus which has a timer transmission function to execute a transmission job for transmitting image data to another apparatus at a designated transmission time of day, and is characterized by comprising: a setting unit configured to set a restraint period of time indicating a period of time that the execution of the transmission job has to be restrained; a reservation unit configured to accept the designation of the transmission time of day, and store the designated transmission time of day as reservation information in a storage unit; and a notifying unit configured to perform notification to a user in a case where the designated transmission time of day is included in the restraint period of time.

According to the present invention, it is possible to control the electric power costs by causing a user to designate timer transmission in a period of time of relatively low unit price of the electricity charges.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
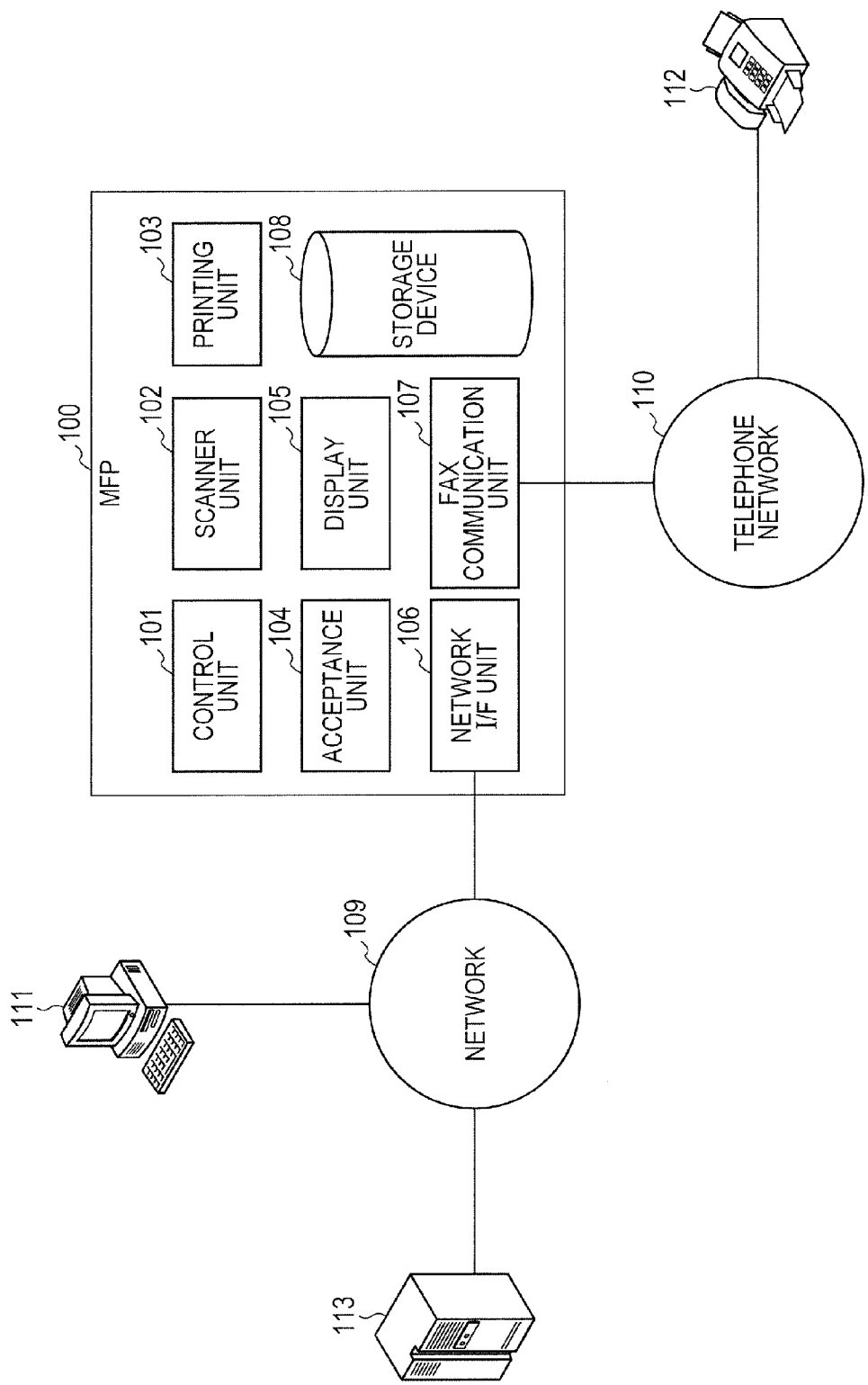
FIG. 1 is a diagram exemplarily illustrating a system to which an image processing apparatus according to the present invention is applicable.

FIG. 1 is a diagram illustrating an example of a system to which an image processing apparatus indicating an embodiment of the present invention is applicable. In FIG. 1, an MFP (multifunction peripheral) 100 serves as an image processing apparatus of the present invention. The MFP 100 has a control unit 101, a scanner unit 102, a printing unit 103, an acceptance unit 104, a display unit 105, a network I/F (interface) unit 106, a FAX communication unit 107 and a storage device 108.

The storage device 108 is a storage unit for storing programs of the control unit 101. The control unit 101 comprehensively controls the processing of the MFP 100 by use of respective components 102 to 108 by executing the programs stored in the storage device 108.

The scanner unit 102 optically reads an original and generates image data. The scanner unit 102 can read a plurality of originals successively and read both sides of the original and also can read an image by dividing the original into a plurality of regions. The images read by the scanner unit 102 are stored in the storage device 108. The printing unit 103 reads out the images from the storage device 108 and performs a printing operation. The printing unit 103 can also perform double-sided printing. A copy function is realized by reading the original at the scanner unit 102 and performing a print output to the printing unit 103.

The acceptance unit 104 can accept an execution instruction of a job such as copy or the like by accepting a key (hard key or soft key) input. The display unit 105, which is a touch panel, can display a job status, an alarm, an error or the setting of device and transmit a signal generated by the depression of a related button conducted by a user to the acceptance unit 104.

The network I/F unit 106, which is connected to a network 109, is used to transmit the image data read by the scanner unit 102 and stored in the storage device 108 to another apparatus such as a PC 111 or the like by a method of FTP (File Transfer Protocol), an E-mail or the like through the network 109. Hereinafter, the above function will be called a net transmission function.

The FAX communication unit 107, which is connected to a telephone network 110, is used to transmit the image data read by the scanner unit 102 and stored in the storage device 108 to another apparatus such as a facsimile apparatus 112 or the like by a FAX through the telephone network 110. Hereinafter, this function is called a FAX transmission function. In addition, the FAX communication unit 107 is also used to receive image data from another facsimile apparatus connected to the telephone network 110 and store the received image data in the storage device 108.

A management server 113 is such a server which manages a unit price table of electricity charges for respective periods of time (hereinafter, it will be called a table of charges for respective periods of time). The table of charges for respective periods of time, which is charge information of respective periods of time indicating a unit price of electricity charges for respective periods of time, is regularly updated by an electric power supplier such as an electric power company or the like. The MFP 100 communicates with the management server 113 through the network I/F unit 106 and acquires the table of charges for respective periods of time. In the present embodiment, the MFP 100 has a timer transmission function for performing a job (transmission job), which responds to the net transmission function or the FAX transmission function at a time of day designated by a user.

Figure 2:
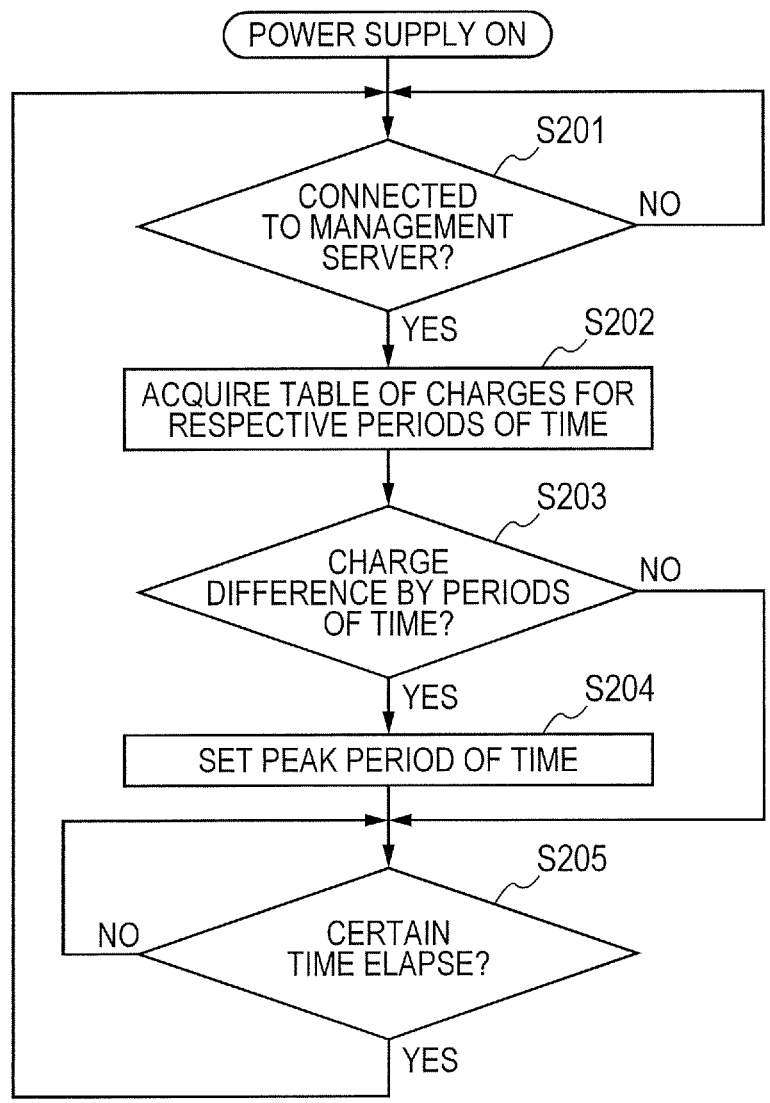
FIG. 2 is a flow chart for exemplarily describing an acquisition process of a table of charges for respective periods of time according to a first embodiment.

Next, an operation of the MFP 100 in the first embodiment will be described with reference to FIG. 2. FIG. 2 is a flow chart indicating an example of a process, by which the MFP 100 acquires the table of charges for respective periods of time from the management server 113 in the first embodiment. A flow of an operation of each step in the flow chart indicated in FIG. 2 is realized by a process that the control unit 101 in the MFP 100 executes a program in the storage device 108 and controls each constituent element of the MFP 100. In the drawing, reference symbols S201 to S205 denote respective steps.

When the MFP 100 activates after turning on the power of the MFP 100, the control unit 101 communicates with the management server 113 for a connecting confirmation through the network I/F unit 106 and determines a connecting state in the step S201. When it is determined that the MFP 100 cannot be connected with the management server 113 (in case of No in step S201), the control unit 101 repeats the step S201. On the other hand, when it is determined that the MFP 100 can be connected with the management server 113 (in case of Yes in step S201), the control unit 101 shifts the process to the step S202.

In the step S202, the control unit 101 acquires the table of charges for respective periods of time from the management server 113 through the network I/F unit 106 and stores the acquired table of charges for respective periods of time in the storage device 108 and then shifts the process to the step S203.

In the step S203, the control unit 101 confirms the table of charges for respective periods of time, which was stored in the storage device 108 in the above step S202, and determines whether or not the charge difference exists in the unit price of electricity charges for respective periods of time. When it is determined that the charge difference exists in the unit price of electricity charges for respective periods of time (in case of Yes in step S203), the control unit 101 shifts the process to the step S204. In the step S204, the control unit 101 stores a period of time having the highest unit price of electricity charges in the storage device 108 as a restraint period of time (hereinafter, it will be called a peak period of time) which is a period of time, where an execution of a transmission job has to be restrained, and then shifts the process to the step S205. On the other hand, when it is determined that the charge difference does not exist in the unit price of electricity charges for respective periods of time (in case of No in step S203), the control unit 101 shifts the process to the step S205 as it is.

In the step S205, the control unit 101 keeps a stand-by state until a certain time is elapsed in order to space the time interval until next acquiring the table of charges for respective periods of time. When it is determined that the certain time has elapsed (in case of Yes in Step S205), the control unit 101 shifts the process to the step S201.

Figure 3:
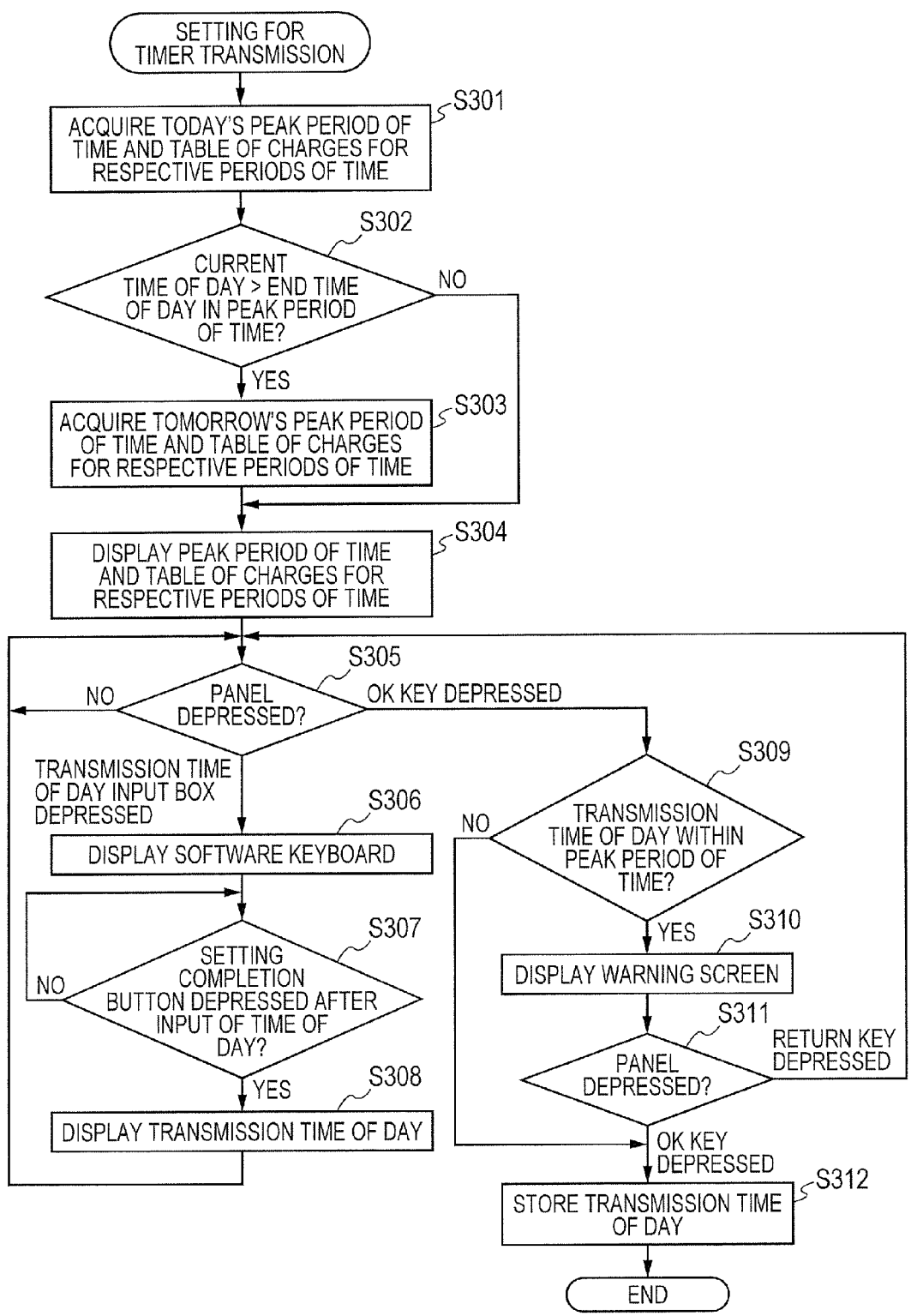
FIG. 3 is a flow chart for exemplarily describing a setting process of a timer transmission time of day according to the first embodiment.

Next, timer transmission setting of the MFP 100 will be described with reference FIGS. 3, 4, 5 and 6. FIG. 3 is a flow chart indicating a process performed when the MFP 100 sets a timer transmission time of day in the first embodiment. A flow of operation of each step in the flow chart indicated in FIG. 3 is realized by a process that the control unit 101 in the MFP 100 executes a program in the storage device 108 and controls each constituent element of the MFP 100. In the drawing, reference symbols S301 to S312 denote respective steps.

In the step S301, the control unit 101 acquires a peak period of time of today and a table of charges for respective periods of time from the storage device 108 and holds the acquired information in the storage device 108 or a memory not illustrated and then shifts the process to the step S302. In the step S302, the control unit 101 compares the peak period of time of today acquired in the above step S301 with a current time of day. In the above step S302, when it is determined that the current time of day does not yet pass the peak period of time of today (in case of No in step S302), the control unit 101 shifts the process to the step S304.

On the other hand, in the above step S302, when it is determined that the current time of day has already passed the peak period of time of today (in case of Yes in step S302), the control unit 101 shifts the process to the step S303. In the step S303, the control unit 101 acquires a peak period of time of tomorrow and a table of charges for respective periods of time and overwrites the peak period of time and the table of charges for respective periods held in the above step S301 and then shifts the process to the step S304.

Figure 4:
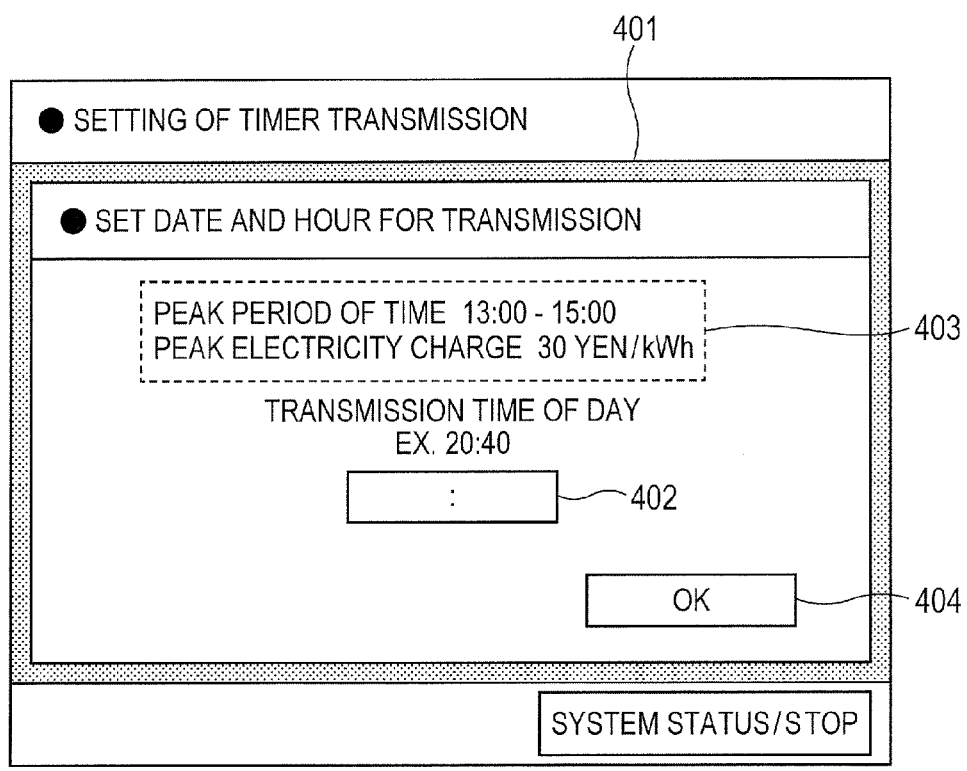
FIG. 4 is a diagram exemplarily illustrating a timer transmission time of day setting screen according to the first embodiment.

In the step S304, the control unit 101 displays a timer transmission time of day setting screen 401 as illustrated in FIG. 4 on the display unit 105 and controls to present that setting screen to a user. At this time, the control unit 101 displays the peak period of time and a unit price of electricity charges for that period of time acquired and held in the above step S302 or S303 on a peak information display area 403 then shifts the process to the step S305. At this time, the control unit 101 may also display a unit price of electricity charges of a period of time before and after the peak period of time on the timer transmission time of day setting screen 401.

FIG. 4 is a drawing indicating an example of the timer transmission time of day setting screen 401 in the first embodiment. The timer transmission time of day setting screen 401 is used for setting a timer transmission time of day. The peak information display area 403 is used for displaying a peak period of time and the charges for that period of time. A transmission time of day input section 402 is used for inputting a time of day when performing the timer transmission. An OK key 404 is used for setting the transmission time of day, which was input in the transmission time of day input section 402, to the timer transmission time of day.

In the step S305, the control unit 101 keeps a stand-by state until conducting the panel depression under the state that the timer transmission time of day setting screen 401 is displayed on the display unit 105. When it is determined that the transmission time of day input section 402 was depressed (in case of "depression of the transmission time of day input section" in step S305), the control unit 101 shifts the process to the step S306. In the step S306, the control unit 101 displays an input screen 2101 as illustrated in FIG. 5 on the display unit 105.

Figure 5:
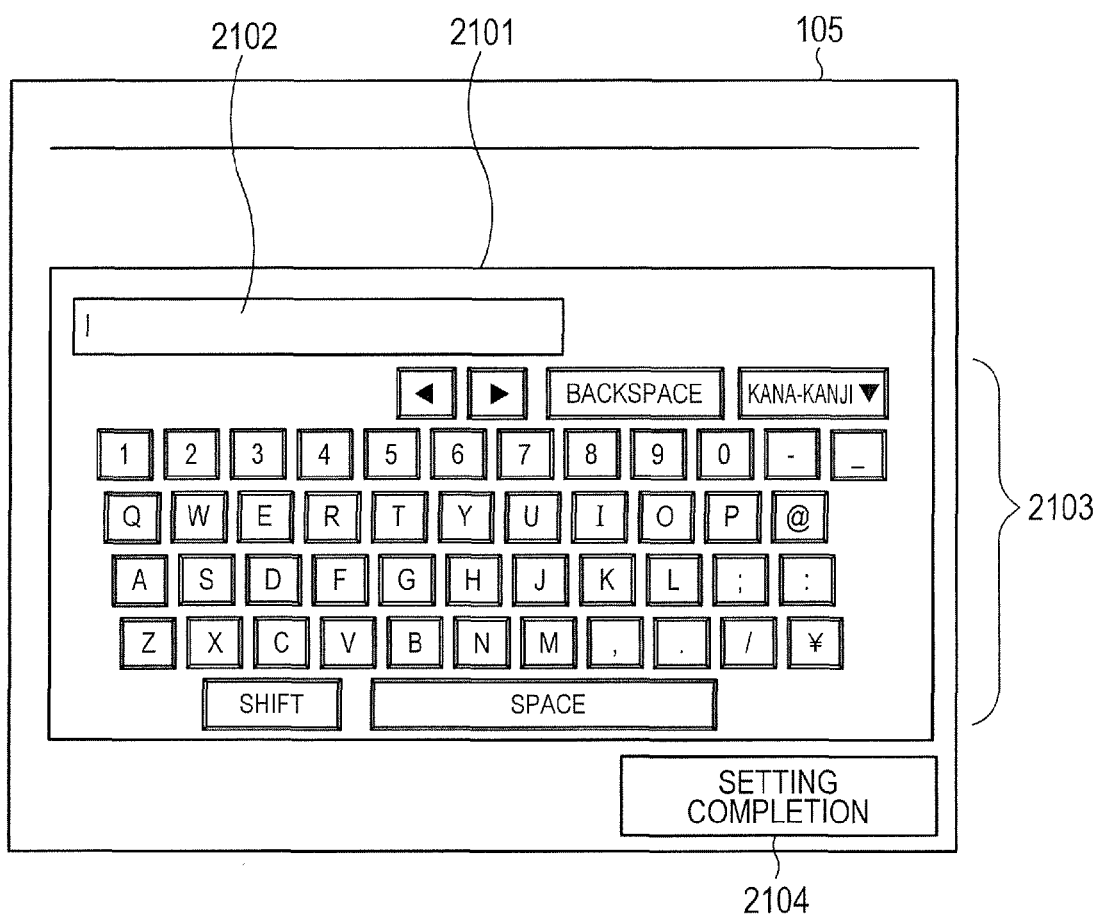
FIG. 5 is a diagram exemplarily illustrating an input screen according to the first embodiment.

FIG. 5 is a drawing illustrating an example of the input screen 2101 in the first embodiment. In FIG. 5, input characters are displayed on a display area 2102, where the contents which are being input are displayed. A software keyboard 2103 includes input keys capable of inputting the characters to be displayed on the display area 2102. A setting completion key 2104 is used to terminate the setting of transmission time of day to be conducted on the input screen 2101.

Next, in the step S307, the control unit 101 keeps a stand-by state until the setting completion key 2104 is depressed under the state that four figures are displayed on the display area 2102. When it is determined that the setting completion key 2104 was depressed under the state that four figures are displayed on the display area 2102 (in case of Yes in step S307), the control unit 101 shifts the process to the step S308. In the step S308, the control unit 101 displays a character string, which was displayed on the display area 2102, on the transmission time of day input section 402 and shifts the process to the step S305.

In the above step S305, when it is determined that the OK key 404 was depressed under the state that the numerical value is displayed on the transmission time of day input section 402 (in case of "OK key depressed" in step S305), the control unit 101 shifts the process to the step S309.

In the step S309, the control unit 101 treats the numerical value, which was displayed on the transmission time of day input section 402, as the transmission time of day and compares this transmission time of day with the peak period of time (the peak period of time acquired and held in the above step S302 or S303) and then determines whether or not the transmission time of day exists within the peak period of time (or whether or not the transmission time of day corresponds to the peak period of time). When it is determined that the transmission time of day exists within the peak period of time (in case of Yes in step S309), the control unit 101 shifts the process to the step S310. On the other hand, when it is determined that the transmission time of day does not exist within the peak period of time (in case of No in step S309), the control unit 101 shifts the process to the step S312.

Figure 6:
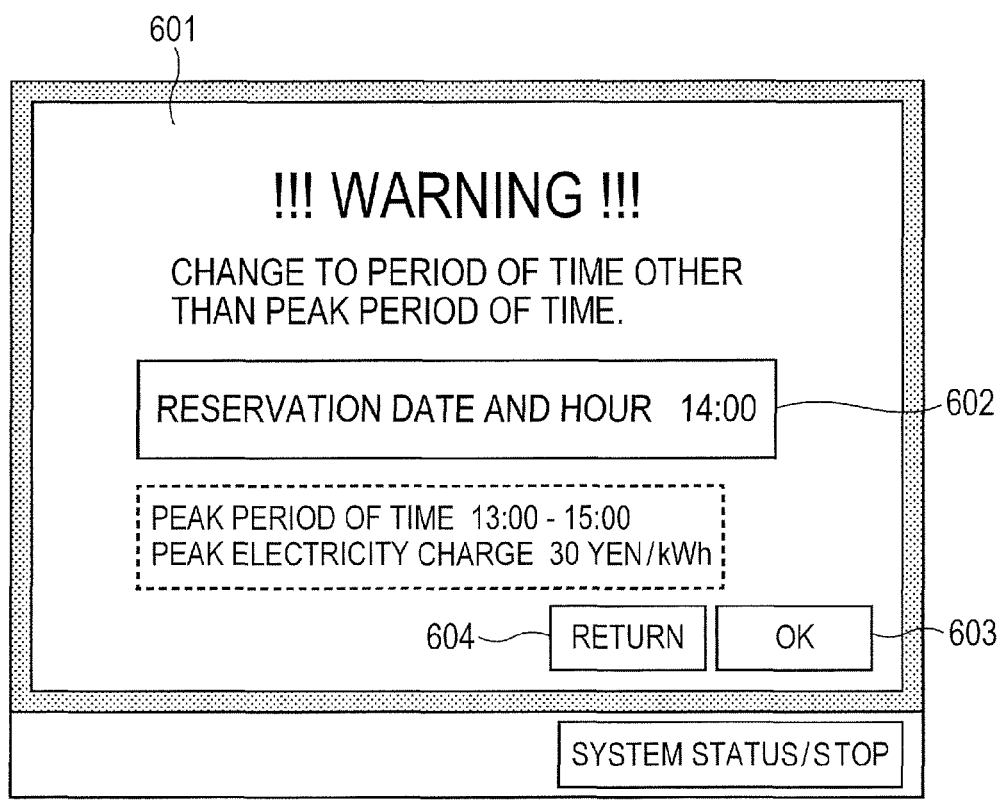
FIG. 6 is a diagram exemplarily illustrating a warning screen according to the first embodiment.

In the step S310, the control unit 101 displays a warning screen illustrated in FIG. 6 on the display unit 105. FIG. 6 is a drawing illustrating an example of a warning screen 601 which is displayed when the transmission time of day designated in the timer transmission setting exists within the peak period of time in the first embodiment. When the warning screen 601 is displayed on the display unit 105, the control unit 101 displays the transmission time of day on a reservation time of day display area 602. A return key 604 is used for re-designating the transmission time of day. An OK key 603 is used for determining a reservation of the timer transmission at the transmission time of day displayed on the reservation time of day display area 602.

Next, in the step S311, the control unit 101 keeps a stand-by state until conducting the panel depression under the state that the warning screen 601 is displayed on the display unit 105. When it is determined that the return key 604 was depressed (in case of "return key depressed" in step S311), the control unit 101 displays a screen, which was displayed just before displaying the warning screen 601, on the display unit 105 and shifts the process to the step S305.

On the other hand, in the above step S311, when it is determined that the OK key 603 was depressed (in case of "OK key depressed" in step S311), the control unit 101 shifts the process to the step S312. In the step S312, the control unit 101 stores (registers) the transmission time of day in the storage device 108 as timer transmission reservation information and then terminates the process of this flow chart.

According to the above process, a user becomes able to surely recognize a peak period of time as a timer transmission time of day by informing the electricity charges at the transmission time of day or a unit price of the electricity charges before and after that transmission time of day to the user when reserving the timer transmission, and the user can avoid the timer transmission reservation at the peak period of time. As a result, the user can designate the timer transmission at the relatively cheap electricity charges and can suppress the electric power cost caused by the timer reservation transmission at the peak period of time.

In the first embodiment, it was exemplified that the peak period of time is displayed on a timer transmission setting screen or the timer transmission reservation can be conducted without change even when a warning screen is displayed after designating the peak period of time. However, it may be controlled that the transmission reservation cannot be conducted when the peak period of time is designated at the timer transmission time of day. For example, the control unit 101 controls that the OK key 603 is not displayed on the warning screen 601 illustrated in FIG. 6 (or the OK key 603 cannot be depressed), a storing process of the transmission time of day instructed in the step S312 indicated in FIG. 3 is not performed and the transmission time of day is reset. That is, when a designated transmission time of day exists within the peak period of time, the control unit 101 does not perform a process of storing the transmission time of day in the storage device 108 instructed in the step S312 and returns the process to the step S305 from the step S311 indicated in FIG. 3 to control to urge the reset of the transmission time of day. According to this constitution, the timer transmission reservation, where the transmission time of day corresponds to the peak period of time, is surely prohibited, and the electric power cost caused by the timer reservation transmission at the peak period of time can be surely suppressed.

Second Embodiment

In the first embodiment, an example, where a reservation setting user is made to be recognized about the peak period of time by displaying a warning screen when the peak period of time is designated as the transmission time of day at the time of setting the reservation of the timer transmission, has been given. In the second embodiment, a case, where a table for charges for respective period of times is changed after the timer transmission reservation and the peak period of time is changed or the MFP 100 first recognizes the peak period of time after the timer transmission reservation, will be described. Since a flow of setting the timer transmission time of day is the same as that of the first embodiment, the description thereof will be omitted here.

Figure 7:
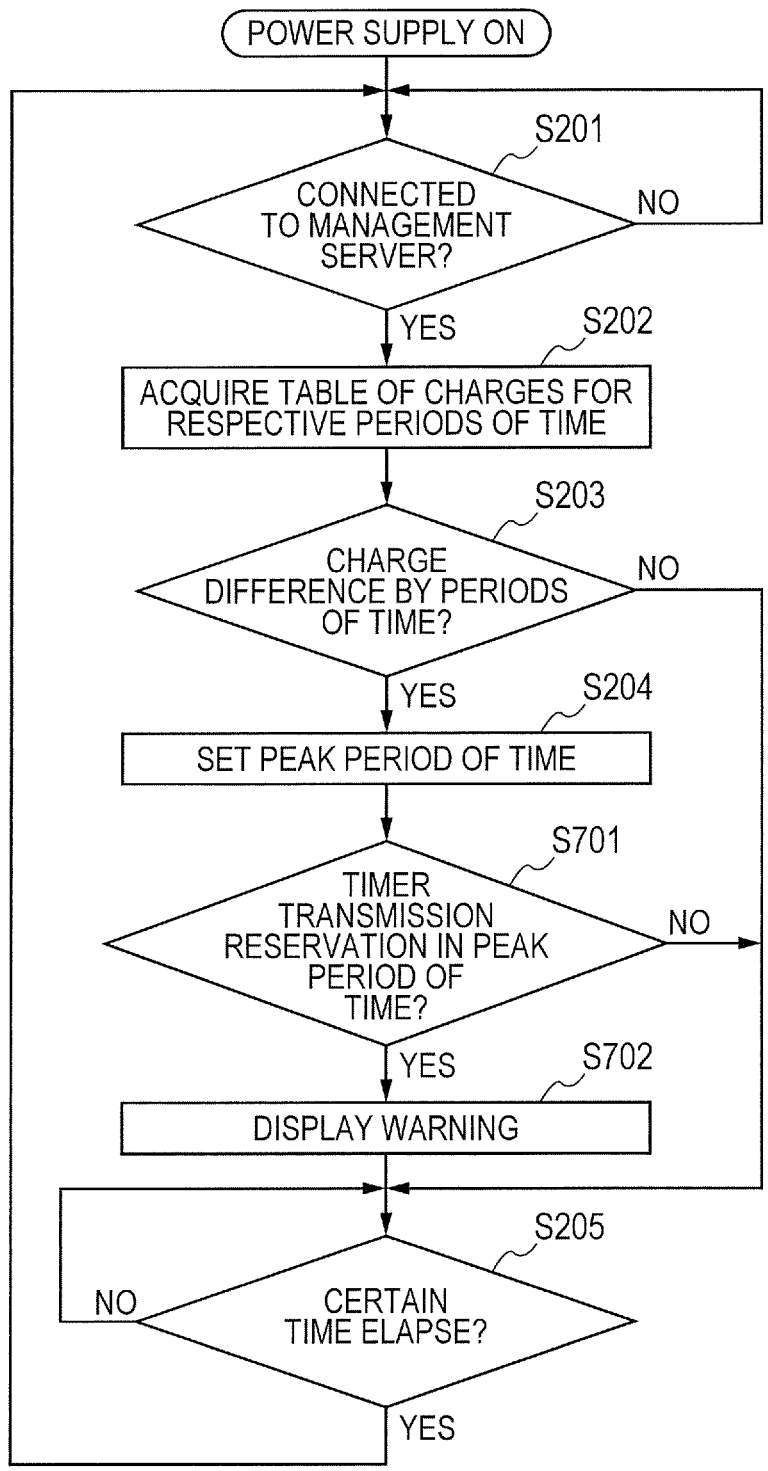
FIG. 7 is a flow chart for exemplarily describing an acquisition process of a table of charges for respective periods of time according to a second embodiment.

FIG. 7 is a flow chart indicating an example of a process that the MFP 100 acquires the table for charges for respective period of times from the management server 113 in the second embodiment. A flow of an operation of each step in the flow chart indicated in FIG. 7 is realized by a process that the control unit 101 in the MFP 100 executes a program in the storage device 108 and controls each constituent element of the MFP 100. In the drawing, reference symbols S201 to S205, S701 and S702 denote respective steps. The same reference symbol is given to the same step as that in FIG. 2.

Since the processes in steps S201 to S204 have been described in FIG. 2, the description thereof will be omitted. Next, in the step S701, the control unit 101 determines whether or not there is the timer transmission reservation, of which the transmission time of day exists within the peak period of time, among the timer transmission reservations stored in the storage device 108 (a storing process is performed in the step S312 indicated in FIG. 3). When it is determined that there is not even the one timer transmission reservation, of which the transmission time of day exists within the peak period of time (in case of No. in step S701), the control unit 101 shifts the process to the step S205 as it is.

On the other hand, in the step S701, when it is determined that there is even the one timer transmission reservation, of which the transmission time of day exists within the peak period of time (in case of Yes in step S701), the control unit 101 shifts the process to the step S702. In the step S702, the control unit 101 displays a warning notice 801 illustrated in FIG. 8 on a lower part of the display unit 105 and shifts the process to the step S205. Since the process to be performed in the step S205 has been described in FIG. 2, the description thereof will be omitted.

Figure 8:
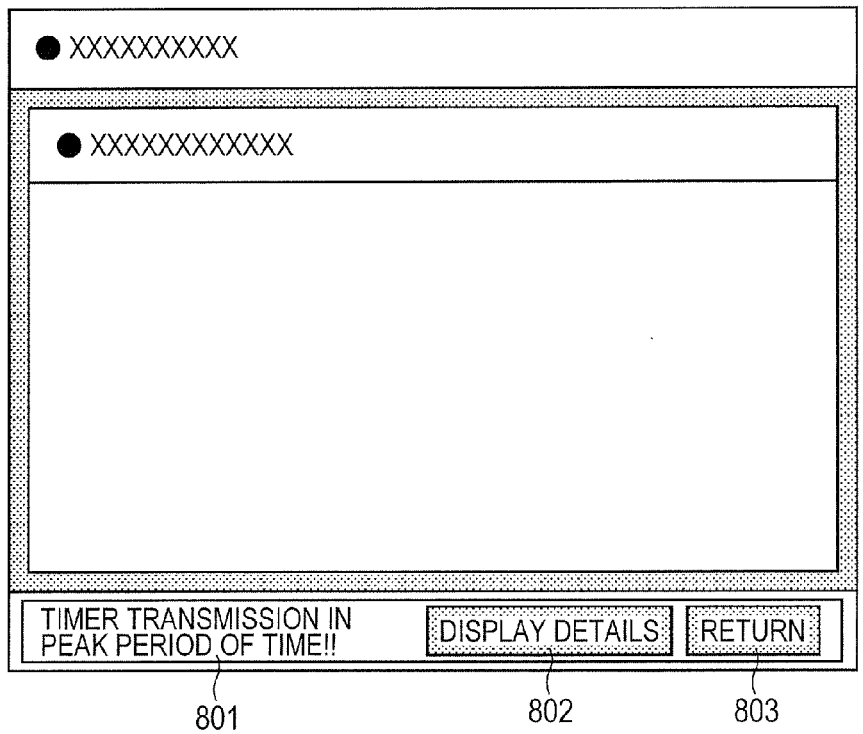
FIG. 8 is a diagram exemplarily illustrating a warning screen according to the second embodiment.

FIG. 8 is a drawing illustrating an example of the warning notice 801 in the second embodiment. The warning notice 801 is used for giving the warning that the timer transmission reservation exists within the peak period of time to a user. An OK button 803 is depressed when the user confirmed the warning notice 801. When it is determined that the OK button 803 was depressed, the control unit 101 returns a display on a lower part of the display unit 105 to a display before the warning notice 801 is displayed. A details display button 802 is used for displaying details of the warning notice. When it is determined that the details display button 802 was depressed, the control unit 101 displays a warning screen 901 illustrated in FIG. 9 on the display unit 105.

Figure 9:
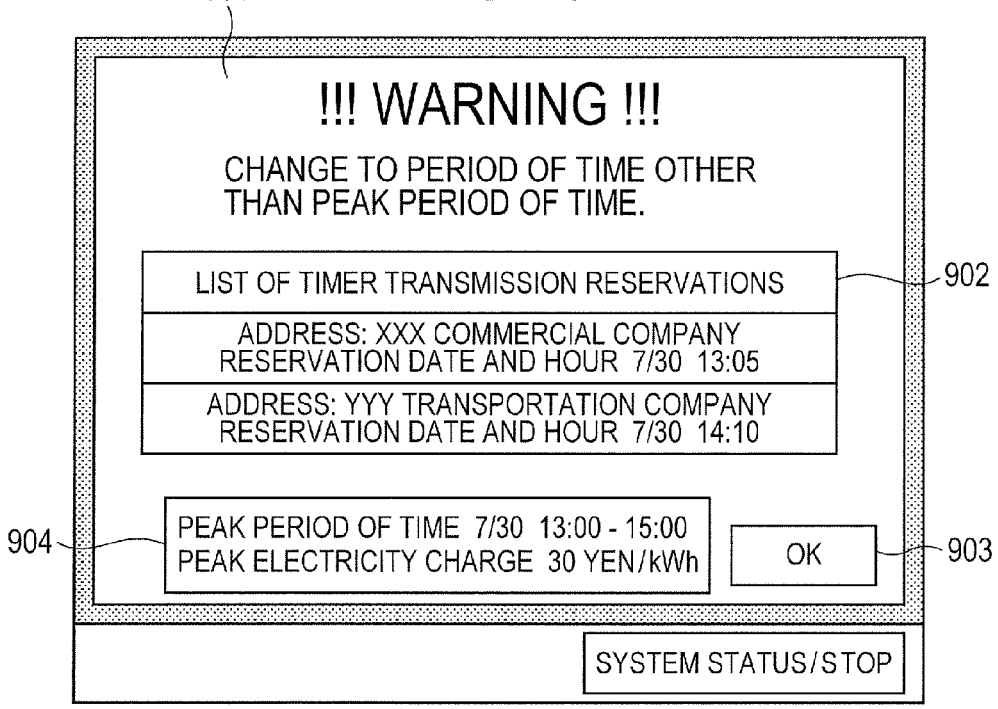
FIG. 9 is a diagram exemplarily illustrating a warning screen according to the second embodiment.

FIG. 9 is a drawing illustrating an example of the warning screen 901 in the second embodiment. The warning screen 901 is used for displaying a list of the timer transmission reservations, where the transmission time of day is set at the peak period of time. When the warning screen 901 is displayed on the display unit 105, the control unit 101 displays a list of the timer transmission reservations, where the transmission time of day is set at the peak period of time, on a display area 902 as a warning timer transmission list. In addition, at this time, the control unit 101 displays the peak period of time and a unit price of electricity charges of the peak period of time on a display area 904. At this time, it may be set that the control unit 101 displays also a unit price of electricity charges of the period of time before and after the peak period of time on the display area 904.

When it is determined that an OK key 903 was depressed, the control unit 101 displays a screen, which was displayed just before displaying the warning screen 901, on the display unit 105 and returns a display on a lower part of the display unit 105 to a display before the warning notice 801 is displayed.

In the step S702 indicated in FIG. 7, when the timer transmission reservation exists in the peak period of time, such a constitution, where the control unit 101 displays the warning notice 801 as illustrated in FIG. 8 on a lower part of the display unit 105, has been indicated. However, in the step S702 indicated in FIG. 7, it may be constituted that a mail, which warns a fact that the timer transmission reservation exists in the peak period of time, is transmitted to a previously set mail address of a device manager. Further, it may be constituted that an SMS (Short Message Service) distribution is performed to the previously set phone number of a mobile phone or the like of the device manager. Further, the warning may be informed to a device manager, who previously follows a contributor, by contributing a message to a short message communication service (also called a micro-blogging service) called the Twitter™ (Twitter, Inc.).

When a user accessed a confirmation screen (not illustrated) for confirming the timer transmission reservation, the control unit 101 may control that the timer transmission reservation, of which the transmission time of day corresponds to the peak period of time, is distinguished from another transmission reservation and displayed on the confirmation screen. For example, as for a display of the timer transmission reservation, of which the transmission time of day exists within the peak period of time, a background or characters of which color is different from that of a display of another timer transmission reservation is used or an icon indicating the peak period of time is added.

When the transmission job is performed at the peak period of time, the control unit 101 controls that the number of times of retry is decreased or the retry itself is not performed. Then, the control unit 101 controls that the remaining retry is performed after passing the peak period of time and entering a non-peak period of time. Because, there is also a case that a device at a receiving side is in a stopped state at the peak period of time and there is possibility of wastefully consuming the power at the retry operation. According to this constitution, the wasteful power cost due to the retry operation can be suppressed.

When it is determined that a timer transmission reservation area in the warning timer transmission list to be displayed on the display area 902 was depressed, the control unit 101 executes the processes indicated in the steps S304 to S312 in FIG. 3, and it may be controlled that the above depressed timer transmission reservation is reset. In addition, it may be constituted that the control unit 101 forcedly deletes the timer transmission reservation to which the above reset was not performed.

According to the above process, even if the peak period of time is changed or newly detected after the timer transmission reservation, a user becomes able to surely recognize that the timer transmission reservation exists within the peak period of time. Accordingly, the user can reset the timer transmission reservation, which exists within the peak period of time, to exist outside the peak period of time. As a result, the electric power cost caused by the timer transmission reservation at the peak period of time can be suppressed.

Another Embodiment

In the above embodiment, although a period of time, where the electricity charges in a table of charges for respective periods of time acquired from the management server 113 becomes the highest charge, is treated as the peak period of time, a period of time, where the device manager wants to suppress the timer transmission, may be manually set to the device as the peak period of time.

Further, in the above embodiment, the constitution of setting a period of time, where the electricity charges in a table of charges for respective periods of time acquired from the management server 113 becomes the highest charge, as the peak period of time has been described. However, it may be constituted that the device manager manually sets a threshold value of a unit price of electricity charges and the whole period of time corresponding to a unit price of electricity charges equal to or larger than the threshold value is set as the peak period of time.

In the above respective embodiments, the constitution that the MFP 100 acquires the charges for respective periods of time from the management server 113 has been described. However, it may be constituted that the MFP 100 acquires the charges for respective periods of time from an external apparatus other than the management server 113 such as a smart meter or the like. In addition, it may be constituted that the device manager sets the charges for respective periods of time to the MFP 100.

In the above respective embodiments, although the constitution that the timer reservation is performed by designating a transmission time of day by using the transmission time of day input section 402 illustrated in FIG. 4 has been described, it may be constituted that the timer reservation can be performed by designating the transmission date and hour (a transmission date and a time of day). In this case, the control unit 101 performs a control by using a unit price table of electricity charges for respective periods of time of the designated date and hour.

In the above respective embodiments, a control regarding the timer reservation of the transmission job has been performed. However, a job, to which the timer reservation can be performed, may be such a job other than the transmission job. For example, the timer reservation of a job, which requires the large power consumption, such as a print job or the like is enabled to be performed, and the same control as that of the above transmission job may be performed regarding the timer reservation of this job. According to this control, the power cost caused by performing the timer reservation of the job, which requires the large power consumption, at the peak period of time can be suppressed.

The storage device 108 illustrated in FIG. 1 may be any kind of storage device if it is such a medium (e.g., an HDD (hard disk drive), an SSD (solid state drive) and a RAM (random access memory)) which can store digital information. In the above embodiment, although it has been described by exemplifying the MFP 100 which can perform any of the reading of an image, the processing of digital information and the printing an image onto a sheet, it may be also acceptable that respective apparatuses separately perform the reading of an image, the processing of digital information and the printing of an image onto a sheet.

Incidentally, the configuration and contents of the above various data are not limited to those described above. Namely, it is needless to say that various configurations and contents can be applied according to intended use and purpose.

As above, the embodiments of the present invention have been described. Meanwhile, the present invention can be carried out as, e.g., a system, an apparatus, a method, a program or a storage medium. More specifically, the present invention can be applied to a system which is composed of a plurality of devices or to an apparatus which consists of a single device.

Moreover, constitutions obtained by properly combining the above embodiments are all included in the present invention.

Moreover, the present invention is achieved by performing the process in which software (program) for achieving the functions of the above embodiments is supplied to a system or an apparatus through a network or various storage media and a computer (or a CPU (central processing unit), an MPU (microprocessor unit) or the like) of the system or the apparatus reads and executes the program.

Moreover, the present invention may be applied to a system including a plurality of devices or to an apparatus consisting of a single device.

The present invention is not limited to the above embodiments, various modifications (including organic combinations of the respective embodiments) can be achieved based on the substance of the present invention, and these modifications are not excluded from the scope of the present invention. That is, all the constitutions obtained by properly combining the above embodiments and their modifications are included in the present invention.

Further Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-125272, filed Jun. 14, 2013, which is hereby incorporated by reference herein in its entirety.

What is claimed is:

1. An image processing apparatus which has a timer transmission function to execute a transmission job for transmitting image data to another apparatus at a designated transmission time of day, comprising:
    a setting unit configured to set a notification period of time based on electricity charge information;
    a reservation unit configured to receive the designation of the transmission time of day, and store the designated transmission time of day as reservation information in a storage unit; and
    a notifying unit configured to perform notification to a user in a case where the designated transmission time of day is included in the notification period of time.

2. The image processing apparatus according to claim 1, wherein the setting unit configured to set the notification period of time based on the electricity charge information for respective period of time.

3. The image processing apparatus according to claim 1, wherein, in a case where the designated transmission time of day is included in the notification period of time, the reservation unit is configured to accept re-designation of the transmission time of day without storing the transmission time of day.

4. The image processing apparatus according to claim 2, further comprising an acquisition unit configured to acquire the electricity charge information for respective periods of time from an external apparatus.

5. The image processing apparatus according to claim 2, wherein the setting unit is configured to set, as the notification period of time, the period of time during which the unit price of electricity charge indicated by the charge information for respective periods of time is highest.

6. The image processing apparatus according to claim 2, further comprising a designation unit configured to designate the unit price of electricity charge,
    wherein the setting unit is configured to set, as the notification period of time, the period of time corresponding to the unit price of electricity charge exceeding the unit price of electricity charge designated by the designation unit.

7. The image processing apparatus according to claim 1, wherein the notification unit is configured to, every time the notification period of time is set by the setting unit, determine whether or not, in the reservation information stored in the storage unit, there is the reservation information indicating the transmission time of day included in the notification period of time, and, in a case where it is determined that there is the reservation information indicating the transmission time of day included in the notification period of time, perform notification to a user.

8. A control method for controlling an image processing apparatus which has a timer transmission function to execute a transmission job for transmitting image data to another apparatus at a designated transmission time of day, the method comprising:
    causing a setting unit to set a notification period of time based on electricity charge information;
    causing a reservation unit to receive the designation of the transmission time of day, and store the designated transmission time of day as reservation information in a storage unit; and
    causing a notifying unit to perform notification to a user in a case where the designated transmission time of day is included in the notification period of time.

9. A non-transitory computer-readable storage medium which stores a computer-executable program for causing a computer to function as an image processing apparatus which has a timer transmission function to execute a transmission job for transmitting image data to another apparatus at a designated transmission time of day, the image processing apparatus comprising:
    a setting unit configured to set a notification period of time based on electricity charge information;
    a reservation unit configured to receive the designation of the transmission time of day, and store the designated transmission time of day as reservation information in a storage unit; and
    a notifying unit configured to perform notification to a user in a case where the designated transmission time of day is included in the notification period of time.

* * * * *